(12) United States Patent
Langley et al.

(10) Patent No.: US 12,492,968 B2
(45) Date of Patent: Dec. 9, 2025

(54) CLIMATE CONTROLLED HOUSING FOR INSTRUMENTATION

(71) Applicant: The Center for Toxicology and Environmental Health, LLC, North Little Rock, AR (US)

(72) Inventors: Justin Langley, League City, TX (US); Derek Kliethermes, League City, TX (US)

(73) Assignee: CTEH, LLC, North Little Rock, AR (US)

( * ) Notice: Subject to any disclaimer, the term of this patent is extended or adjusted under 35 U.S.C. 154(b) by 259 days.

(21) Appl. No.: 18/216,244

(22) Filed: Jun. 29, 2023

(65) Prior Publication Data

US 2024/0019348 A1 Jan. 18, 2024

Related U.S. Application Data

(60) Provisional application No. 63/388,389, filed on Jul. 12, 2022.

(51) Int. Cl.
*G01N 1/22* (2006.01)
*G01N 33/00* (2006.01)
*F25B 21/02* (2006.01)

(52) U.S. Cl.
CPC ....... *G01N 1/2273* (2013.01); *G01N 33/0009* (2013.01); *G01N 33/0016* (2013.01); *F25B 21/02* (2013.01); *G01N 2201/0221* (2013.01)

(58) Field of Classification Search
CPC ......... G01N 1/2273; G01N 2001/2282; G01N 33/0016; G01N 33/0009; F25B 21/02
See application file for complete search history.

(56) References Cited

U.S. PATENT DOCUMENTS

| | | | | |
|---|---|---|---|---|
| 5,005,410 | A | * | 4/1991 | Webster ................. G01N 25/56 374/28 |
| 7,422,909 | B2 | | 9/2008 | Schur et al. |
| 9,051,605 | B2 | | 6/2015 | Son et al. |
| 10,324,030 | B2 | | 6/2019 | Sanroma et al. |
| 2008/0281528 | A1 | | 11/2008 | Relle, Jr. |
| 2018/0238797 | A1 | * | 8/2018 | Sanroma ................. G01N 21/01 |
| 2019/0383844 | A1 | * | 12/2019 | Miyazaki ............... G01N 30/24 |
| 2023/0094980 | A1 | | 3/2023 | Birnkrant et al. |

* cited by examiner

*Primary Examiner* — Paul M. West

(57) ABSTRACT

The invention is a portable, climate controlled housing for sampling instrumentation having an outer housing and an insulted interior housing for receiving the sampling instrumentation, a sampling hose is connectable from the instrumentation to outside of the housing, a thermoelectric cooler device is provided within the outer housing to cool the interior of the outer housing, one or more exhaust fan are provided to remove air from inside the outer housing, a temperature probe is disposed within the interior insulated housing and a thermostat is operably connected to the exhaust fan, the cooler device and the temperature probe so that when the interior temperature of the insulated housing is detected to be outside a preferred range, the thermoelectric cooler device and the exhaust fan are operated until the interior temperature within the insulated housing is within a preferred range.

6 Claims, 4 Drawing Sheets

CLIMATE CONTROLLED HOUSING FOR INSTRUMENTATION

CROSS-REFERENCE TO RELATED APPLICATIONS

This application claims the benefit of priority from U.S. Provisional Application Ser. No. 63/388,389 filed on Jul. 12, 2022, which is incorporated herein by reference.

FIELD OF THE INVENTION

The present invention relates to housings for protecting instrumentation during use in a remote field operation.

BACKGROUND OF THE INVENTION

Portable gas chromatograph/mass spectrometers are used by emergency responders to analyze substances suspected to contain toxic materials, explosives, chemical warfare agents or other hazardous substances. These instruments are highly sensitive and can detect substances at the parts-per-billion to parts-per-trillion level. Portable gas chromatographs adapted for remote field operations typically weigh between 30 to 40 pounds.

Environmental conditions during a remote field operation can vary greatly, especially with regard to air temperature. Because gas chromatographs are sensitive to ambient temperatures, steps must be taken during remote field use to mitigate adverse environmental conditions that may affect operation. Such efforts include placing the device within an ice chest that contains disposable ice packs. This approach is impractical, cumbersome and condensation from the ice packs can cause failure of the instrumentation.

A need has existed in the art for a protective enclosure that shields sensitive instrumentation from adverse environmental conditions so that operation is uninterrupted.

BRIEF SUMMARY OF THE INVENTION

The present invention is a protective enclosure that permits continuous remote operation of a portable gas chromatograph or other sensitive equipment under a wide range of environmental conditions. The device includes a rigid housing having an equipment charging module, climate controlled interior and an insulated case for the gas chromatograph or other instrumentation. Power is provided by a 110-volt outlet and a 12-volt battery supply. Optionally, an external solar power bank with solar power charging unit may be provided. The housing is configured for continuous instrument charging via a 110-volt power splitter. The device preferably includes a Peltier type (or other) cooling unit with thermostat to ensure optimum operating temperatures within the housing. The housing maintains optimal operating temperatures inside the housing and outside the insulated case containing the gas chromatograph or other instrumentation. Mechanical fans exhaust warm air generated by the portable gas chromatograph and/or electrical components within the housing and the thermostat controlled unit within the housing maintains an optimum temperature within the housing.

The present invention is also directed to a portable climate controlled housing for sampling instrumentation comprising a sealable outer housing defining a cavity, a sealable interior housing provided within the outer housing, the interior housing is insulated and adapted to receive gas sampling instrumentation, a gas sampling hose having first and second ends, the sampling hose is connectable to a gas sampling instrumentation at its first end and the second end is in fluid communication with ambient air exterior of the outer housing, a thermoelectric cooler device, the thermoelectric cooler device is disposed within the outer housing to cool the cavity of the outer housing, at least one exhaust fan, the at least one exhaust fan adapted to remove air from the cavity of the outer housing, a temperature probe, the temperature probe is disposed within the interior insulated housing and a thermostat, the thermostat is operably connected to the at least one exhaust fan, the thermoelectric cooler device and the temperature probe whereby when the interior temperature of the insulated housing is detected by the thermostat to be outside a preferred temperature range, the thermoelectric cooler device and the at least one exhaust are operated until the interior temperature of the insulated housing is within a preferred temperature range.

DETAILED DESCRIPTION OF THE INVENTION

Figure 1:
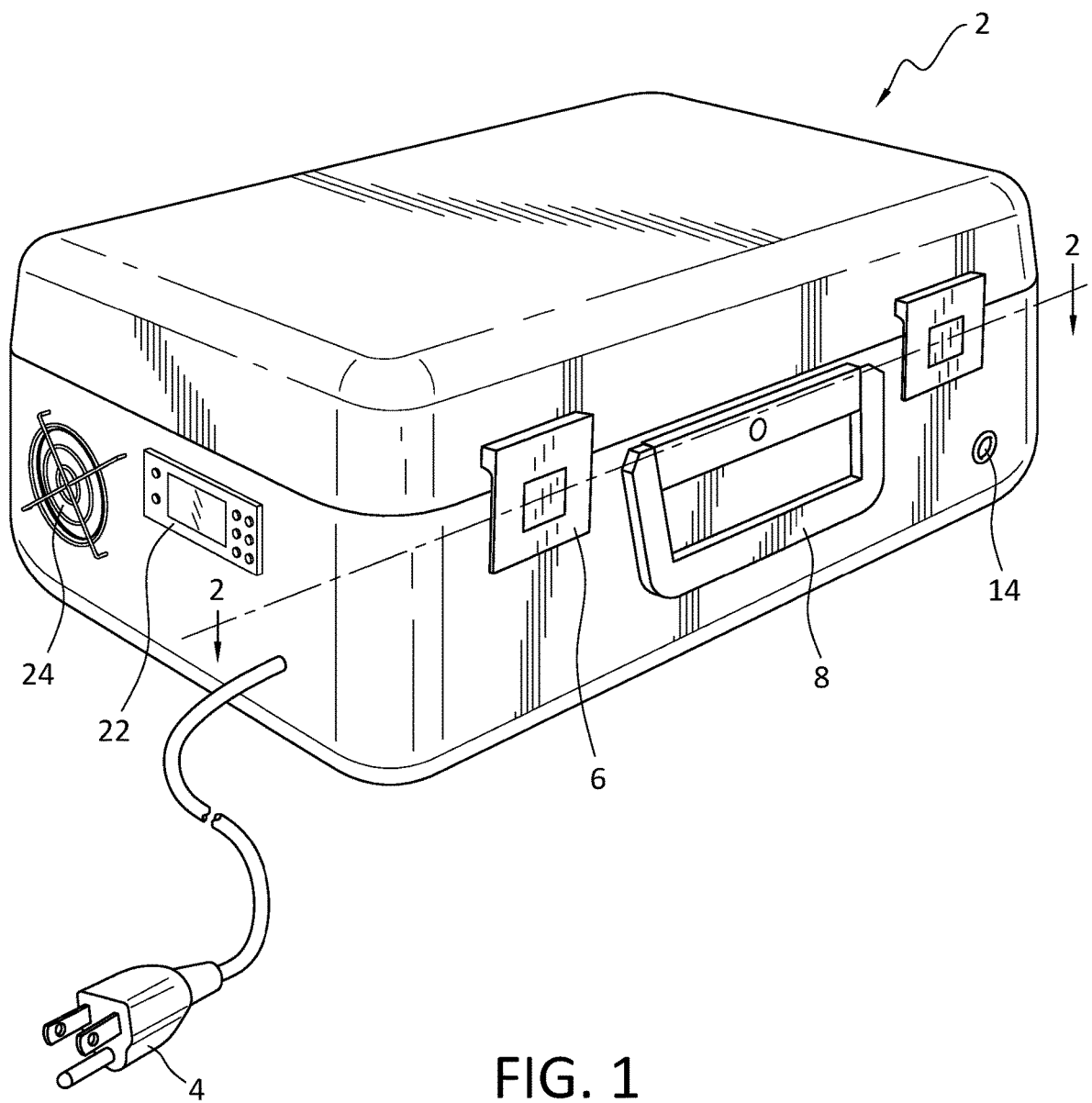
FIG. 1 is a perspective view of the present invention.
Figure 3:
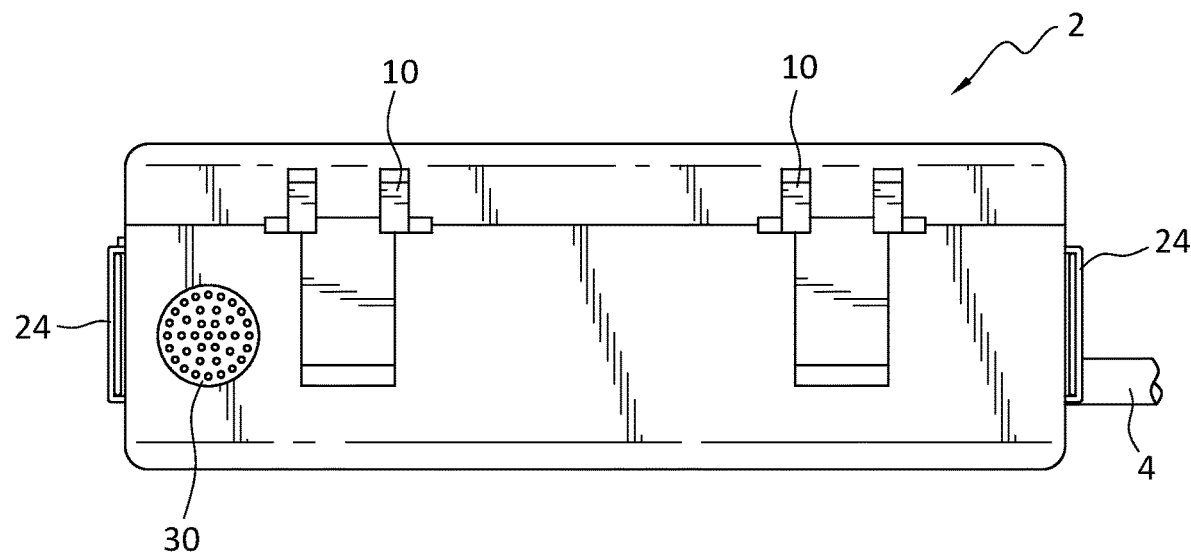
FIG. 3 is a rear view of the invention shown in FIG. 1.
Figure 4:
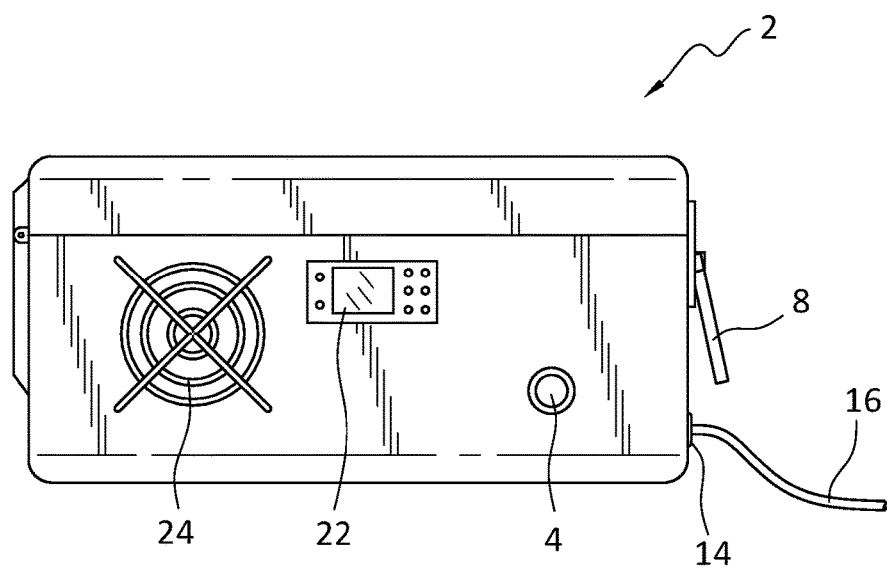
FIG. 4 is a side view of the invention shown in FIG. 1.
Figure 5:
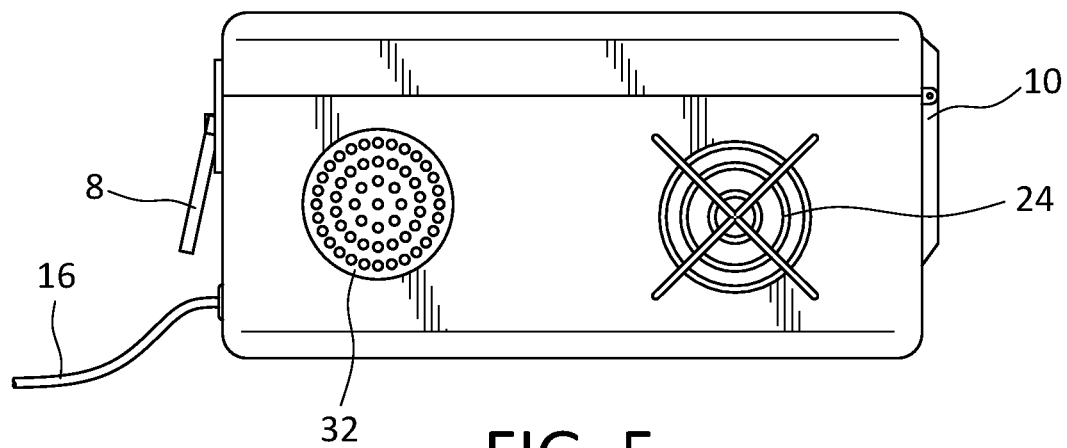
FIG. 5 is an opposite side view of the invention in FIG. 1.

FIG. 1 illustrates the housing 2 according to the present invention including associated power cord 4. The housing 2 is preferably an impact-resistant hard plastic case having latches 6 or other closure mechanism with optional handle 8. FIG. 3 shows a pair of hinges 10 provided at the rear of the housing 2. Power cord 4 is preferably a standard 110 v three prong power supply cord. Other construction materials for the housing are within the scope of the present invention so long as the material provides sufficient impact resistance. An inlet 14 adapted to receive the sampling hose 16 (FIG. 4) of a gas chromatograph is provided on the front of housing 2.

Figure 2:
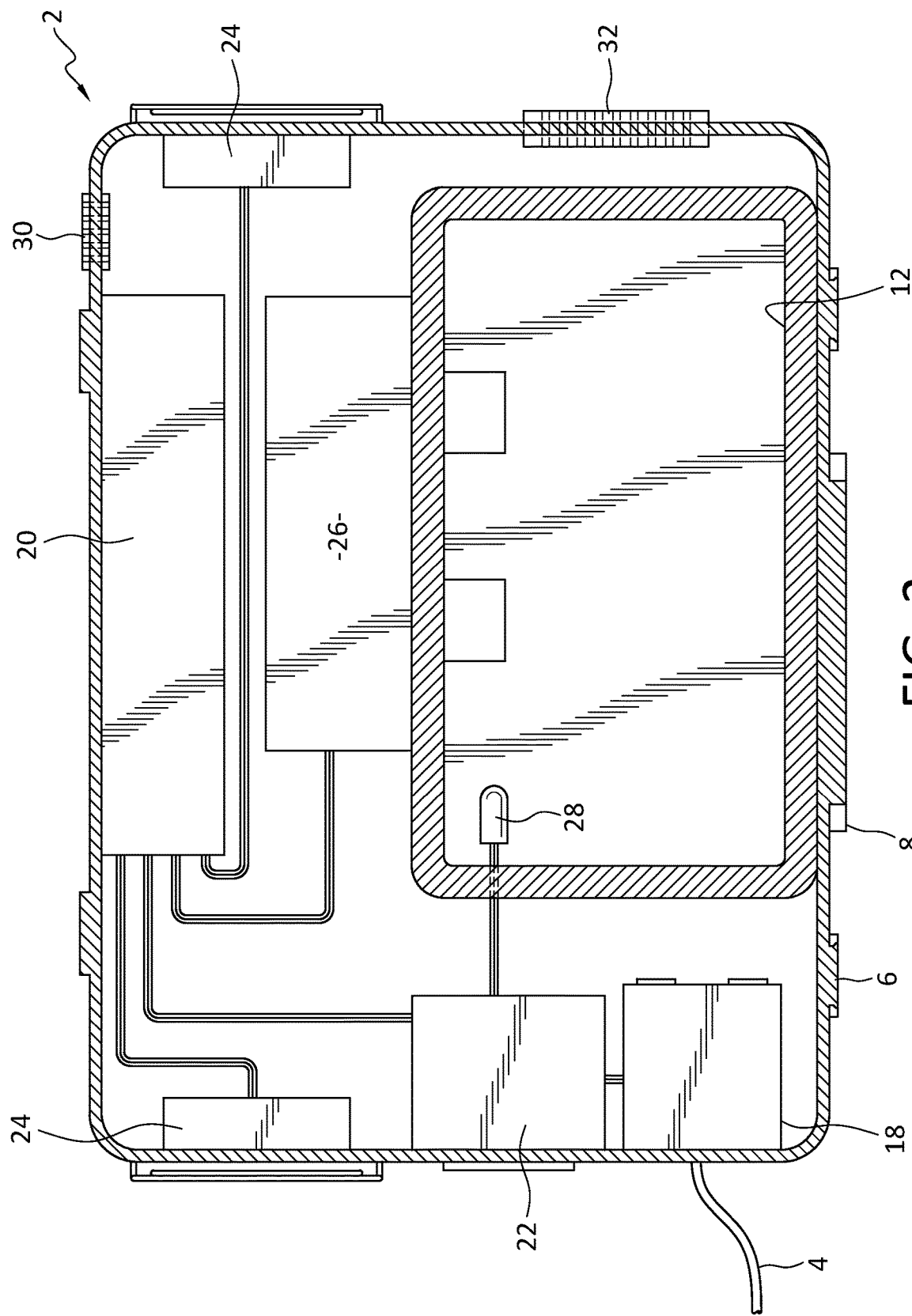
FIG. 2 is a sectional view along lines 2-2 of FIG. 1.

Turning to FIG. 2, the interior of housing 2 is shown in detail. A gas chromatograph or other sensitive instrument (not shown) is disposed in an insulated instrument case 12. Electricity to power the gas chromatograph is supplied by a standard 110 v three prong power supply cord 4.

The power supply cord 4 energizes a two-gang outlet 18 and a 110 v power splitter or switcher 20. The 110 v power switcher 20 provides continuous power to a thermostat 22. The thermostat 22 is hardwired to control exhaust fans 24 provided on each side of the housing 2 and a Peltier cooler 26 when activated by an associated temperature probe 28 disposed in instrument case 12.

An exhaust port 30 extends through the wall of housing 2 and is preferably adjacent power splitter/switcher 20 to vent warm air generated by the power splitter when the exhaust fans 24 are not operating.

A perforated air inlet 32 extends though housing 2 to enable outside ambient air to enter the housing 2. As noted earlier, the sampling hose of the portable gas chromatograph or other instrumentation (FIG. 4) is connected to inlet 14 when the gas chromatograph is enclosed within the insulated instrument case 12.

Figure 6:
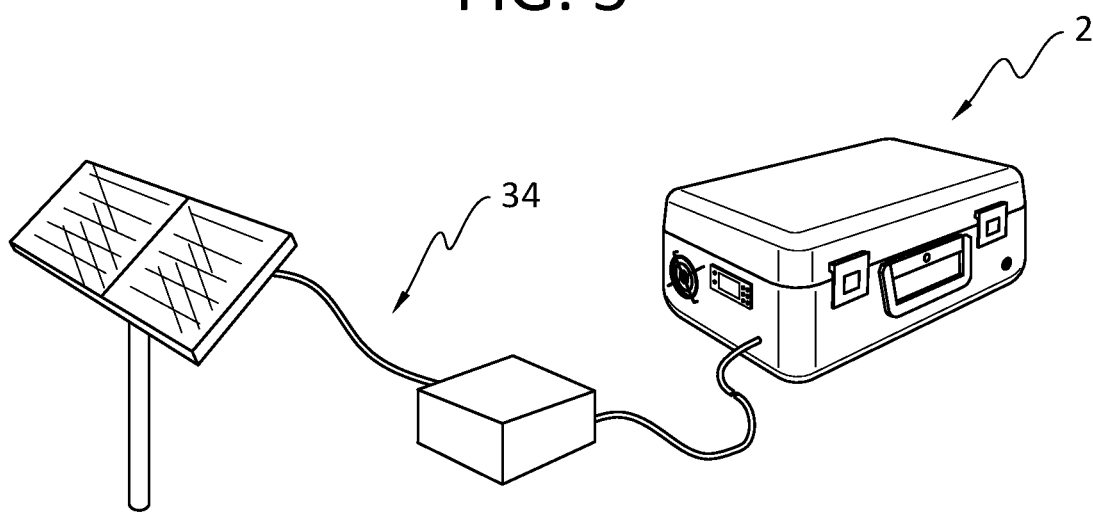
FIG. 6 is a perspective view of the invention with an external solar power bank.

FIG. 6 illustrates the invention in combination with an external solar power bank with solar charging unit 34 for supplying electricity to the housing.

Figure 7:
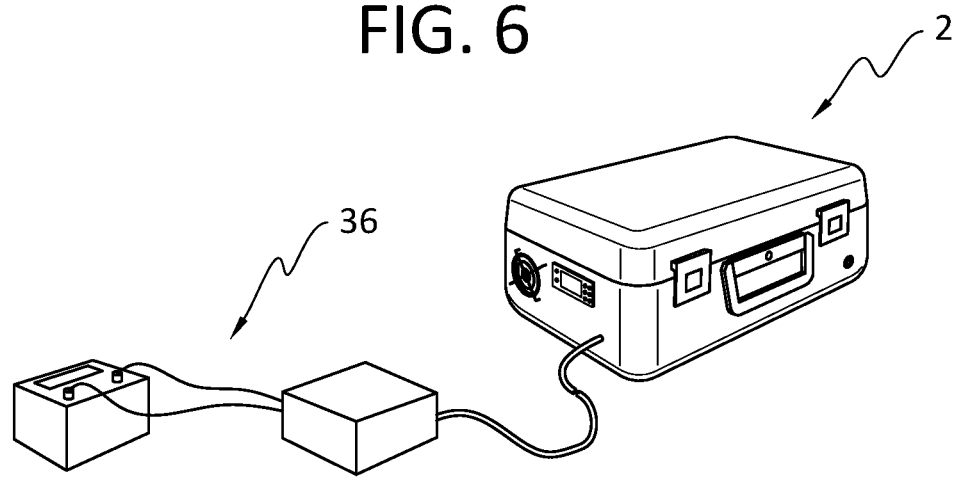
FIG. 7 is a perspective view of the invention with a 110-volt outlet and 12-volt battery supply.

FIG. 7 illustrates the invention in combination with a 12-volt battery and 12-volt battery power supply 36 for supplying electricity to the housing.

In operation, a portable gas chromatograph or other instrumentation is placed within the insulated instrument case of the housing and connected to a power supply. Charging cables (not shown) may be provided from the two-gang outlet and into the insulated instrument case 12 to provide power to operate the gas chromatograph or other instrumentation. The sampling hose of the gas chromatograph is connected to its inlet. The power supply is turned on to energize the two-gang outlet and the 110 v power splitter. Power supplied to the 110 v power splitter is routed through the thermostat to control the Peltier cooler device and associated exhaust fans. The thermostat directs electrical power to operate the Peltier cooler device and the exhaust fans once the temperature probe inside the insulated instrument case registers a temperature outside of the gas chromatograph's optimal operating temperature range. When an optimal temperature inside of the insulated instrument case is achieved, the thermostat will de-energize the Peltier cooling unit and associated fans to reduce energy consumption. The exhaust port will passively exhaust any warm air generated by the 110 v power switches to maximize efficiency when the two exhaust fans are not in operation. The perforated air inlet 32 allows outside ambient air to enter the interior of the housing and reduce exhaust fan washout.

While this invention has been described as having a preferred design, it is understood that it is capable of further modifications, uses and adaptations, both in whole and in part, while following the general principle of the invention including such departures from the present disclosure as is known or customary practice in the art to which this invention pertains, and as may be applied to the central features of this invention.

We claim:

1. A portable climate controlled housing for sampling instrumentation comprising:

a) a sealable outer housing defining a cavity;

b) a sealable interior housing provided within the outer housing, the interior housing is insulated and adapted to receive gas sampling instrumentation;

c) a gas sampling hose having first and second ends, the sampling hose is connectable to a gas sampling instrumentation at its first end and the second end is in fluid communication with ambient air exterior of the outer housing;

d) a thermoelectric cooler device, the thermoelectric cooler device is disposed within the outer housing to cool the cavity of the outer housing;

e) at least one exhaust fan, the at least one exhaust fan adapted to remove air from the cavity of the outer housing;

f) a temperature probe, the temperature probe is disposed within the interior insulated housing; and g) a thermostat, the thermostat is operably connected to the at least one exhaust fan, the thermoelectric cooler device and the temperature probe whereby when the interior temperature of the insulated housing is detected by the thermostat to be outside a preferred temperature range, the thermoelectric cooler device and the at least one exhaust are operated until the interior temperature of the insulated housing is within a preferred temperature range.

2. The climate controlled housing as in claim 1 and further comprising an air inlet port and an air exhaust port, the air inlet and exhaust ports are connected to the outer housing to allow passive air flow into and out of the outer housing cavity.

3. The climate controlled housing as in claim 1 and further including a power source.

4. The climate controlled housing as in claim 3 and wherein the power source is a battery.

5. The climate controlled housing as in claim 3 and wherein the power source is an external solar power bank having a solar charging unit.

6. The climate controlled housing as in claim 1 and wherein the sealable outer housing is constructed from a rigid and hardened impact resistant material.

\* \* \* \* \*